United States Patent

[11] 3,624,091

[72] Inventors Werner Daum Uerdingen; Heinrich Krimm, Uerdingen; Hans Scheinpflug, Leverkusen; Paul-Ernst Frohberger, Leverkusen; Ferdinand Grewe, Leverkusen, all of Germany

[21] Appl. No. 876,141
[22] Filed Nov. 12, 1969
[45] Patented Nov. 30, 1971
[73] Assignee Farbenfabriken Bayer Aktiengesellschaft Leverkusen, Germany
[32] Priority Nov. 16, 1968
[33] Germany
[31] P 18 09 385.1

[54] OXIME-O-CARBONIC ACID ESTERS
10 Claims, No Drawings

[52] U.S. Cl. .......... 260/287 R, 260/463, 260/544 M, 260/544 Y, 424/258, 424/301

[51] Int. Cl. .......... C07c 131/00, C07c 135/00, A01n 9/20

[50] Field of Search .......... 260/463, 453, 287 R

[56] References Cited

UNITED STATES PATENTS 3,031,373 4/1962 Schisla et al. .......... 424/258

OTHER REFERENCES

Chemical Absracts Vol. 67, 99614W(1967).

*Primary Examiner*—Lewis Gotts
*Assistant Examiner*—Diana G. Rivers
*Attorney*—Burgess, Dinklage & Sprung

ABSTRACT: Oxime-O-carbonic acid esters, i.e., mono and di alkyl and/or phenyl ketoxime-O-carbonic acid, -(di to penta halo-phenyl), -[([mono and di alkyl and/or phenyl ketoxime-O'-carbonyloxy]-di to penta halo-phenyl-alkyl)-di to penta halo-phenyl], -diphenyl, and -quinolyl, -esters, which possess fungicidal properties and which may be produced by conventional methods.

OXIME-O-CARBONIC ACID ESTERS

The present invention relates to and has for its objects the provision for particular new oxime-O-carbonic acid esters, i.e., mono and di alkyl and/or phenyl ketoxime-O-carbonic acid, -(di to penta halo-phenyl), -[([mono and di alkyl and/or phenyl ketoxime-O'-carbonyloxy]-di to penta halo-phenyl-alkyl)-di to penta halo-phenyl], -diphenyl, and -quinolyl, -esters, which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

It is known that trichloromethylmercapto compounds, in particular N-trichloromethylthio-tetrahydrophthalimide (A), can be used as fungicidally active compounds (cf. German Pat. No. 912,290).

It has now been found, in accordance with the present invention, that the particular new oxime-O-carbonic acid esters of the formula $$X—O—CO—O—N=C(R^1)(R^2) \quad (I)$$

in which $R^1$ is alkyl of one to four carbon atoms or phenyl, $R^2$ is alkyl of one to four carbon atoms, phenyl or hydrogen, and X is (i)

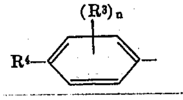

in which $R^3$ and $R^4$ each individually is chloro, bromo or iodo, and

*n* is a whole number from one to four, (ii)

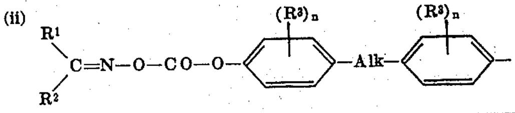

in which $R^1$, $R^2$, $R^3$ and *n* are the same as defined above, and

Alk is alkylene of one to four carbon atoms, (iii) diphenyl, or (iv) quinolyl, exhibit strong fungicidal properties.

It has been furthermore found, in accordance with the present invention, that the particular new compounds of formula (I) above may be produced by the process which comprises a. reacting a phenol type compound of the formula X—OH (II) in which X is the same as defined above, e.g.:

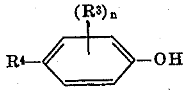

(III)

in which $R^3$, $R^4$ and *n* are the same as defined above, in the presence of an acid-binding agent or in the form of the corresponding alkali metal salt, for example the potassium, sodium, or the like salt, with an oxime-O-carbonic acid ester chloride of the formula:

$$Cl—CO—O—N=C(R^1)(R^2) \quad (III)$$

in which $R^1$ and $R^2$ are the same as defined above, or b. reacting a chloroformic acid phenyl ester-type compound of the formula X—O—CO—Cl (IV) in which X is the same as defined above, e.g.:

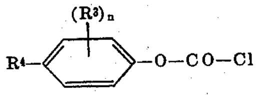

(IVi)

in which $R^3$, $R^4$ and *n* are the same as defined above, with an alkali metal salt or alkaline earth metal salt of an oxime of the formula:

$$M—O—N=C(R^1)(R^2) \quad (V)$$

in which $R^1$ and $R^2$ are the same as defined above, and

M represents one equivalent of the alkaline earth metal or alkali metal, e.g. one equivalent of barium, calcium, strontium, magnesium, etc., or sodium, potassium, etc., and the like.

Surprisingly, the particular new active compounds according to the present invention show a higher fungitoxic effectiveness than the previously known N-trichloromethylthio-tetrahydrophthalimide (A). The active compounds according to the present invention therefore represents a valuable contribution to the art.

If, for example, 3-chloro-2,4,6-triiodo-phenol and acetoxime-O-carbonic acid ester chloride are used as starting materials in accordance with process variant (a), or 3-chloro-2,4,6-triiodo-phenylcarbonic acid ester chloride and the sodium salt of acetoxime are used in accordance with process variant (b), the reaction courses are represented by the following schemes:

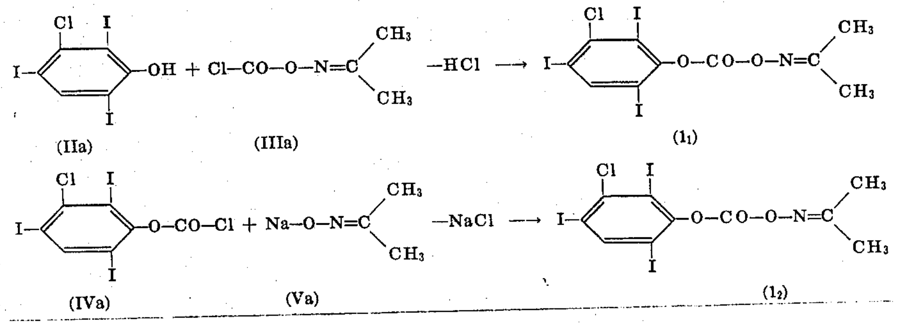

The starting materials which may be used for process variants (a) and (b) are clearly defined by the formulas (II), (III), (IV) and (V) above.

Advantageously, in accordance with the present invention, in the various formulas set forth herein:

$R^1$ represents straight and branched chain lower alkyl hydrocarbon of one to four carbon atoms such as methyl, ethyl, *n*- and isopropyl, *n*-, iso-, sec.- and tert.-butyl, and the like, especially $C_{1-3}$ or $C_{1-2}$ alkyl; or phenyl;

$R^2$ represents straight and branched chain lower alkyl hydrocarbon of one to four carbon atoms such as methyl to tert.-butyl inclusive as defined above, and the like, especially $C_{1-3}$ or $C_{1-2}$ alkyl;

phenyl; or hydrogen; and

X represents (i)

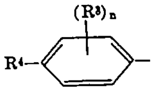

in which $R^3$ and $R^4$ each individually is chloro, bromo or iodo, and *n* is a whole number from one to four;

(ii)

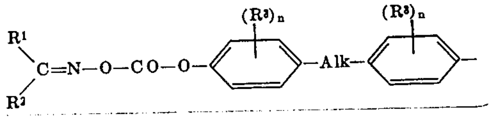

in which $R^1$, $R^2$, $R^3$ and *n* are the same as defined above, and

Alk is a straight or branched lower alkylene hydrocarbon of one to four carbon atoms such as methylene ($—CH_2—$);

ethylene [i.e. dimethylene$—(CH_2)_2—$];

methyl-methylene[$—(CH_3)CH—$];

n-propylene[i.e. trimethylene$—(CH_2)_3—$];

1-methyl-ethylene[i.e. $—(CH_3)CHCH_2—$];

ethyl-methylene [i.e. $—(C_2H_5)CH—$];

dimethyl-methylene[i.e.$—(CH_3)_2C—$];

n-butylene[i.e. tetramethylene$—(CH_2)_4—$];

1-methyl-propylene[i.e.$—(CH_3)CHCH_2CH_2—$];

2-methyl-propylene[i.e.$—CH_2(CH_3)CHCH_2—$];

1-ethyl-ethylene[i.e.$—(C_2H_5)CHCH_2—$];

1,1-dimethyl-ethylene[i.e.$—(CH_3)_2CCH_2—$];

1,2-dimethyl-ethylene [i.e.$—(CH_3)CHCH(CH_3)—$];

n-propyl-methylene [i.e.$—(n—C_3H_7)CH—$];

iso-propyl-methylene [i.e.$—(i—C_3H_7)CH—$];

and in the case of asymmetric moieties also:

2-methyl-ethylene [i.e.$—CH_2—CH(CH_3)—$];

3-methyl-propylene [i.e.$—CH_2—CH_2CH(CH_3)—$];

2-ethyl-ethylene[i.e.$—CH_2—CH(C_2H_5)—$]; or 2,2-dimethyl-ethylene[i.e$—CH_2CH(CH_3)_2—$]; and the like;

(iii) diphenyl including 2-, 3- and 4-phenyl-phenyl and especially ortho-diphenyl, i.e., 2-phenyl-phenyl; or (iv) benzopyridyl, i.e., quinolyl, especially quinol-8-yl.

Preferably, $R^1$ and $R^2$ each individually is $C_{1-4}$ alkyl; or phenyl; and X is (i)

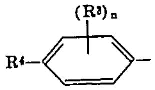

in which $R^3$ and $R^4$ each individually is chloro; or bromo; or iodo; and *n* is two to four; or (ii)

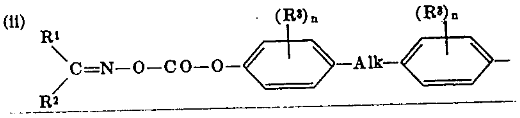

in which $R^1$, $R^2$, $R^3$ and *n* are the same as defined above, and Alk is $C_{2-4}$ alkylene; or (iii) orthodiphenyl; or (iv) quinolyl.

In particular, $R^1$ and $R^2$ each individually is $C_{1-4}$ alkyl; or phenyl; and X is (i)

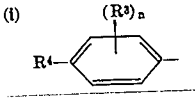

in which $R^3$ and $R^4$ each individually is chloro; or bromo; or iodo; and *n* is two to four; or (ii)

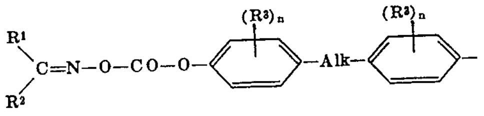

in which $R^1$, $R^2$, $R^3$ and *n* are the same as defined above, and Alk is dimethyl-methylene (i.e.$—(CH_3)_2C—$); or (iii) orthodiphenyl; or (iv) quinol-8-yl.

Examples of the phenols of formula (II) above which may be reacted with the oxime-O-carbonic acid ester chlorides of formula (III) above or, after phosgenation has been effected to provide the corresponding chloroformic acid phenyl type ester of formula (IV) above, with the salts of oximes of formula (V) above, include 3,4-dichloro-phenol, 2-phenyl-phenol, 3-chloro-2,4-dibromo-phenol, 3-chloro-4,6-dibromo-phenol, 3,6-dichloro-2,4-dibromo-phenol, 3,6-dichloro-2,4-diiodo-phenol, 2-chloro-4,5,6-tribromo-phenol, 2,4,5,6-tetra-bromo-phenol, 2-iodo-4,5,6-tribromo-phenol, 2,4,6- and 2,4,5,-trichloro-phenol, 2,3,4,6-tetra-chloro-phenol, 2,4,6-tribromo-phenol, 2,4-dibromo-6-iodo-phenol, 2,6-dibromo-4-iodo-phenol, 2,4-diiodo-6-bromo-phenol, 2,6-diiodo-4-bromo-phenol, 2,4-dibromo-5-chloro-6-iodo-phenol, 2,6-diiodo-4-chloro-phenol, 2,4-diiodo-5-chloro-6-bromo-phenol, 2-iodo-5-chloro-4,6-dibromo-phenol, 4-iodo-5-chloro-2,6-dibromo-phenol, 2,6-diiodo-5-chloro-4-bromo-phenol, 2,4,6-tribromo-5-chloro-phenol, 2,4,6-triiodo-5-chloro-phenol, pentachloro-phenol, pentabromo-phenol, 3,5-dichloro-2,4,6-tribromo-phenol, 2,4,5-trichloro-6-iodo-phenol, 2,4,6-tribromo-3-phenyl-phenol, 2,2-bis-(3',5'-dibromo-4'-hydroxy-phenyl)-propane, bis-(3',5'-diiodo-4'-hydroxy-phenyl)-methane, 8-hydroxy-quinoline, and the like.

In this regard, as used herein the term "phenol" is meant to include the corresponding hydroxy-quinoline compounds.

Examples of the oxime-O-carbonic acid ester chlorides of formula (III) above which may be reacted include acetone, butan-2-one, pentan-3-one, methyl-isobutyl-ketone, methylisopropyl-ketone, acetophenone-, propiophenone-, acetaldehyde-, butyro-phenone-, isobutyraldehyde-, benzaldehyde-, benzophenone-oxime-O-carbonic acid ester chloride, and the like.

Process variant (a) is expediently carried out in an inert organic solvent, such as acetone, methylethyl ketone, methylene chloride, chlorobenzene, benzene, toluene, acetonitrile, benzonitrile, ethyl acetate, and the like. This variant (a) is generally carried out at substantially between about −40° to +100° C., and preferably from between about −10° to +40° C. The hydrogen chloride forming in the reaction may be bound by basic substances such as triethylamine, dimethylbenzylamine, dimethylaniline, diethylaniline, pyridine, picoline, quinoline, potassium carbonate, sodium carbonate, borax, trilithium phosphate, magnesium carbonate, and the like, or the alkali metal salts of the phenols may be used directly for reaction. It is, however, also possible to react the phenols in a mixture of water and an inert water-immiscible solvent, such as methylene chloride or benzene, by adding, simultaneously with the oxime-O-carbonic acid ester chloride solution, the aqueous solution of alkali to the reaction vessel, and working advantageously in the presence of a catalytic amount of a quaternary ammonium salt, such octadecyl-trimethyl-ammonium chloride.

The resulting oxime-O-carbonic acid phenyl type esters of formula (I) above are compounds of differing stability; some of them can be distilled in a high vacuum, but some are such unstable compounds even at 100° C. that no definite melting points can be obtained.

Only some of the oxime-O-carbonic acid ester chlorides of formula (III) above used as starting materials herein are known. These starting materials can be prepared, for example, by reacting the corresponding oxime of formula (V) above with phosgene at temperatures of from substantially between about −20° to +50° C., and preferably from between about −10° to +10° C., in the presence of a tertiary amine, such as dimethylaniline, diethylaniline, pyridine, picoline, quinoline, triethylamine, dimethylcyclohexylamine, and the like, in an inert organic solvent, such as methylene chloride, ethylene chloride, carbon tetrachloride, ligroin, toluene, chlorobenzene, and the like, separating from the reaction mixture the corresponding hydrochloride of the tertiary amine, for example by filtration or by washing out with cold, greatly diluted mineral acid, (optionally) drying over sodium sulfate, and concentrating the resulting solution (compare U.S. Pat. No. 3,193,561, particularly Example 19; J. Agric. Food Chem. 14 1966, pp. 356–365; Z. Chemie 7 (1967), pp. 344–345; and Belgian Pat. No. 709,182). It is not necessary to prepare the oxime-O-carbonic acid ester chlorides in pure form; for the reaction with the phenols, solutions of the oxime-O-carbonic acid ester chlorides can be used.

In process variant (b), the phenylcarbonic acid ester chloride of formula (IV) above may be reacted with the alkali metal salt or alkaline earth metal salt of the oxime of formula (V) above in an inert solvent, such as acetonitrile, benzonitrile, acetone, methylethyl ketone, benzene, toluene, and the like, at temperatures of from substantially between about −20° to +60° C., and preferably from between about −10° to +40° C.

The phenylcarbonic acid ester chlorides of formula (IV) above used as starting materials in process variant (b) may be obtained by phosgenating the phenols of formula (II) above in an inert solvent in the presence of a hydrogen chloride-binding base, such as dimethylaniline, diethylaniline, pyridine, triethylamine, dimethylcyclohexylamine, dimethylbenzylamine, and the like, within a temperature range of substantially between about −70° to +100° C., and preferably at from between about −30° C. to +20° C., by adding phosgene and a hydrogen chloride-binding base, preferably a solution of alkali, to a mixture of the phenol, water and an inert, water-immiscible solvent, and keeping the temperature between the freezing point of the aqueous solution and about +50° C., the phosgene and base being expediently used in excess in order to attain as high as possible a yield of phenylcarbonic acid ester chloride.

Advantageously, the particular new active compounds according to the present invention exhibit strong fungitoxic activity. In the concentration necessary for the control of fungi and bacteria such compounds do not damage cultivated plants, and have a low toxicity to warmblooded animals. For these reasons, the instant compounds are suitable for use as crop protection agents for the control of fungi and bacteria. Fungitoxic agents in crop protection, such as the instant active compounds, are used, for example, for the control of *Archimycetes*, *Phycomycetes*, *Ascomycetes*, *Basidiomycetes*, *Fungi Imperfecti*, and the like.

The active compounds according to the present invention have a very broad spectrum of activity and can be used against parasitic fungi which infest above-the-soil parts of plants or attack the plants from the soil, as well as seed-borne pathogenic agents.

The instant active compounds have, for example, proved effective against *Phytophthora infestants*, *Plasmopara viticola*, *Venturia inaequalis*, *Podosphaera leucotricha*, *Cochliobolus*, *miyabeanus*, *Mycosphaerella musicola*, *Cercospora personata*, *Botrytis cinerea*, *Alternaria species*, *Piricularia oryzae*, and the like.

In particular, the instant active compounds have given good results in the control of rice diseases. Thus, the instant compounds show an excellent activity against the fungi *Piricularia oryzae* and *Pellicularia sasakii*, so that such compounds can be used for the joint control of these two diseases. This is an important advantage, since up to now agents from different chemical groups or classes have generally had to be used, respectively, against these two fungi.

The instant active compounds are also effective and of particular practical importance when such active compounds are used as seed dressing or soil treatment agents against phytopathogenic fungi which adhere to the seed or occur in the soil and cause, in cultivated plants, disease of seedlings, root-rots, tracheomycoses, stem, blade, leaf, blossom, fruit or seed diseases, such as *Tilletia caries*, *Helminthosporium gramineum*, *Fusarium nivale*, *Fusarium culmorum*, *Rhizoctonia solani*, *Phialophora cinerescens*, *Verticillium alboatrum*, *Fusarium dianthi*, *Fusarium cubense*, *Fusarium oxysporum*, *Fusarium solani*, *Sclerotinia sclerotiorum*, *Thielaviopsis basicola*, *Phytophthora cactorum*, and the like.

The active compounds according to the present invention also show bacteriostatic activity against phytopathogenic bacteria as well as insecticidal activity, particularly against phytopathogenic insects.

The active compounds according to the instant invention can be utilized, if desired, in the form of the usual formulations or compositions with conventional inert (i.e., plant compatible or herbicidally inert) pesticide diluents or extenders, i.e., diluents or extenders of the type usable in conventional pesticide formulations or compositions, e.g., conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons e.g., chlorobenzenes, etc.), paraffins (e.g., petroleum fractions), chlorinated aliphatic hydrocarbons e.g., methylene chloride, etc.), alcohols (e.g., methanol, ethanol, propanol, butanol, etc.), amines (e.g., ethanolamine, etc.), ethers, ether-alcohols (e.g., glycol monomethyl ether, etc.), amides (e.g., dimethyl formamide etc.), sulfoxides (e.g., dimethyl sulfoxide, etc.), ketones (e.g., acetone, etc.), and/or water; as well as inert dispersible finely divided solid carriers, such as ground natural minerals (e.g., kaolins, alumina, silica, chalk, i.e., calcium carbonate, talc, kieselguhr, etc.) and ground synthetic minerals (e.g., highly dispersed silicic acid, silicates, e.g., alkali silicates, etc.), whereas the following may be chiefly considered for use as conventional carrier vehicle assistants, e.g. surface-active agents, for this purpose: emulsifying agents, such as nonionic and/or anionic emulsifying agents (e.g., polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, or herbicides, insecticides, nematocides, bactericides, bird-repellants, growth-promoting substances, plant nutrients, soil structure improving agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier compositions mixtures in which the active compound is present in an amount substantially between about 0.1–95 percent, and preferably 0.5–90 percent, by weight of the mixture, whereas carrier composition mixtures suitable for direct application or field application generally contemplate those in which the active compound is present in an amount substantially between about 0.0005–0.5 percent, preferably 0.001–0.2 percent, by weight of the mixture. Thus, the present invention contemplates overall compositions which comprise mixtures of a conventional dispersible carrier vehicle such as (1) a dispersible carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally about 0.0005–95 percent, and preferably 0.001–95 percent, by weight of the mixture.

More particularly, when the active compound is used as a leaf fungicide, the concentration thereof can be varied within a fairly wide range, and is generally substantially between about 0.005–0.5 percent, and preferably 0.001–0.2 percent, by weight of the mixture, as aforesaid.

In the same way, in the case of seed treatment, the active compound is generally used in an amount of substantially between about 0.1–10 g., and preferably 0.5–5 g., per kg. of seed, irrespective of the presence or absence of the carrier vehicle.

Also, for soil treatment, the active compound is generally used in an amount of substantially between about 1–500 g., and preferably 10–200 g., per cubic meter of soil, i.e., irrespective of the presence or absence of the carrier vehicle.

The active compound can also be used in accordance with the well-known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 80 or 95 percent by weight of the active compound, or even the 100 percent active substance alone, e.g., about 20–100 percent by weight of the active compound.

In particular, the present invention contemplates methods of selectively killing, combating or controlling fungi, which comprises applying to at least one of (a) such fungi and (b) their habitat, i.e., the locus to be protected, a fungicidally effective or toxic amount of the particular active compound of the invention alone or together with a carrier vehicle as noted above. The instant formulations or compositions are applied in the usual manner, for instance by squirting, spraying, atomizing, vaporizing, scattering, dusting, watering, sprinkling, pouring, and the like.

It will be realized, of course, that the concentration of the particular active compound utilized in admixture with the carrier vehicle will depend upon the intended application. Therefore, in special cases, it is possible to go above or below the aforementioned concentration ranges, amounts per kg. of seed and amounts per unit volume of soil.

The fungicidal effectiveness of the new compounds of the present invention is illustrated, and without limitation, by the following examples.

EXAMPLE 1

(i) Piricularia and Pellicularia protective test

| | |
|---|---|
| Solvent: | 4 parts by weight acetone |
| Dispersing agent: | 0.50 part by weight sodium oleate |
| Water: | 95.75 parts by weight $H_2O$ |
| Other additive: | 20 part by weight gelatin |

The amount of the particular active compound required for the desired final concentration of such active compound in the spray liquor is mixed with the stated amount of solvent, and the resulting concentrate is diluted with the stated amount of water containing the stated dispersing agent and other additive.

Two batches, each consisting of 30 rice plants about 2–4 weeks old, are sprayed (i.e., treated) with the spray liquor which contains the active compound, until dripping wet. The plants remain in a greenhouse at temperatures of 22°–24° C. and a relative atmospheric humidity of about 70 percent until they are dry. One batch of the plants is then inoculated with an aqueous suspension of 100,000 to 200,000 spores/ml. of *Piricularia oryzae* and placed in a chamber at 24°–26° C. and 100 percent relative atmospheric humidity. The other batch of the plants is infected with a culture of *Pellicularia sasakii* grown on malt agar and placed at 28°–30° C. and 100 percent relative atmospheric humidity.

5 to 8 days after inoculation, the infestation of all the leaves present at the time of inoculation with *Piricularia oryzae* is determined as a percentage of the untreated but also inoculated control plants. In the case of the plants infected with *Pellicularia sasakii*, the infestation on the leaf sheaths after the same time is also determined in proportion to the untreated but infected control. 0 percent means no infestation; whereas 100 percent means that the infestation is exactly as great as in the case of the control plants.

(ii) Additional test/curative fungicidal action

In order to ascertain the curative fungicidal activity, the foregoing test is repeated, but in this case the particular active compound is applied not before, but only 16 hours after, inoculation.

The particular active compounds tested, their concentrations and the results obtained can be seen from the following table 1.

TABLE 1.—PIRICULARIA (a)—AND PELLICULARIA (b) TEST

| Active compound No. (See Ex. 6 to 8) | Infestation as a percentage of the infestation of the untreated control with a concentration of active compound (in percent) of— a/0.05 | b/0.05 |
|---|---|---|
| (A) 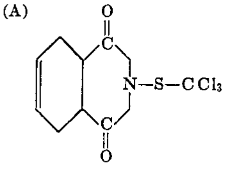 (known) | Pr. 25 | 100 |
| $(2_1)$ | Pr. 0 | 0 |
| | Cur. 0 | – |
| $(3_1)$ | Pr. 0 | 17 |
| $(4_1)$ | Pr. 0 | 0 |

NOTE.—Pr.=protective. Cur.=curative.

EXAMPLE 2

Example 1 (i) is repeated using the particular active compounds shown in the following table 2 to provide the results set forth therein.

TABLE 2

Piricularia (a) and Pellicularia (b) test

| Active compound No. (See ex. 6 to 8) | Infestation as a percentage of the infestation of the untreated control with a concentration of active compound (in %) of | | a 0.05 | a 0.025 | b 0.05 | b 0.025 |
|---|---|---|---|---|---|---|
| ($5_1$) | | | | | 0 | 25 |
| ($6_1$) | | | | | 12 | 42 |
| ($7_1$) | | | | | 0 | 75 |
| ($8_1$) | | | 0 | 8 | 0 | 0 |
| ($9_1$) | | | | | 0 | 17 |
| ($10_1$) | | | 0 | 0 | 0 | 0 |
| ($11_1$) | | | 16 | 50 | 0 | 0 |
| ($12_1$) | | | 0 | 0 | 0 | 0 |
| ($13_1$) | | | | | 0 | 0 |
| ($14_1$) | 25 | | | | 0 | 0 |
| ($15_1$) | | | | | 0 | 25 |
| ($16_1$) | | | | | 0 | 0 |
| ($17_1$) | 25 | 33 | | | 0 | 0 |
| ($18_1$) | | | | | 0 | 0 |

EXAMPLE 3

Mycelium growth test

Nutrient medium used:

- 20 parts by weight agar agar (powdered)
- 30 parts by weight malt extract
- 950 parts by weight distilled water Proportion of solvent to nutrient medium:

- 2 parts by weight acetone
- 100 parts by weight agar nutrient medium

The amount of the particular active compound required for the desired final concentration of such active compound in the nutrient medium is mixed with the stated amount of solvent. The resulting concentrate is thoroughly mixed, in the stated proportion, with the liquid nutrient medium (which has been cooled to 42° C.) and is then poured into petri dishes of 9 cm. diameter. Control dishes to which the active compound preparation has not been added are also set up.

When the nutrient medium has cooled and solidified, the dishes are inoculated with the species of fungi stated in table 2 below and incubated at about 21° C.

Evaluation is carried out after 4–10 days, dependent upon the speed of growth of the fungi. When evaluation is carried out the radial growth of the mycelium on the treated nutrient media is compared with the growth on the control nutrient media. In the evaluation of the fungus growth, the following characteristic values are used:

- 0 no fungus growth
- 1 very strong inhibition of growth
- 2 inhibition of growth
- 3 slight inhibition of growth
- 4 growth equal to that of untreated control.

The particular active compounds tested, their concentrations and the results obtained can be seen from the following table 3.

TABLE 3.—MYCELIUM GROWTH TEST

| Active compound No. (see Ex. 6 to 8) | Concentration of active compound in p.p.m. | Fungi: *Piricularia oryzae* | *Phialophora cinerescens* | *Pellicularia sasakii* | *Cerospora muscae* | *Fusarium dianthi* | *Cochliobolus miyab.* | *Colletotrichum coff.* |
|---|---|---|---|---|---|---|---|---|
| (A) 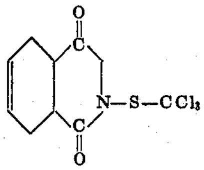 | 10 | 1 | 3 | 4 | 2 | 3 | 4 | ---- |
| ($2_2$) | 10 | 0 | 2 | 1 | 1 | ---- | ---- | 2 |
| ($19_1$) | 10 | 0 | 1 | 1 | 0 | ---- | 1 | 2 |
| ($20_1$) | 10 | 0 | 0 | 0 | 0 | 0 | 0 | 0 |
| ($21_1$) | 10 | 0 | 3 | 0 | 0 | 3 | 3 | 2 |

EXAMPLE 4

Seed dressing test/bunt of wheat (seed-born mycosis)

To produce a suitable dry dressing, the particular active compound is extended with a mixture of equal parts by weight of talc and kieselguhr to give a finely powdered mixture with the desired final concentration of such active compound.

Wheat seed is contaminated with 5 g. of the chlamydospores of *Tilletia caries* per kg. of seed. To apply the dressing, the seed is shaken with the dressing in a closed glass flask. The seed, on moist loam under a cover of a layer of muslin and 2 cm. of moderately moist compost soil, is exposed to optimum germination conditions for the spores for 10 days at 10° C. in a refrigerator.

The germination of the spores on the wheat grains, each of which is contaminated with about 100,000 spores, is subsequently determined microscopically. The smaller the number of spores which have germinated, the more effective is the given active compound.

The particular active compounds tested, their concentrations in the dressing, the amounts of dressing used and the percentage spore germination can be seen in table 4.

TABLE 4

Seed dressing test/bunt of wheat

| Active compound No. (See Ex. 6 to 8 | Concentration of active compound in dressing in % by weight | Amount applied of dressing in g./kg. seed | Spore germination in % |
|---|---|---|---|
| undressed | — | — | >10 |
| | 30 | 1 | 0.000 |
| ($22_1$) | 10 | 1 | 0.05 |
| | 30 | 1 | 0.005 |
| ($19_1$) | 10 | 1 | 0.05 |
| ($20_1$) | 30 | 1 | 0.000 |
| | 30 | 1 | 0.005 |
| ($2_3$) | 10 | 1 | 0.05 |

EXAMPLE 5

Fusicladium test (apple scab) (Protective)

| | |
|---|---|
| Solvent: | 4.7 parts by weight acetone |
| Emulsifier: | 0.3 part by weight alkylaryl polyglycol ether |
| Water: | 95 parts by weight |

The amount of the particular active compound required for the desired concentration of such active compound in the spray liquid is mixed with the stated amount of solvent, and the resulting concentrate is diluted with the stated amount of water which contains the stated emulsifier.

Young apple seedlings in the four to six leaf stage are sprayed (i.e., treated) with the active compound-containing spray liquid until dripping wet. The plants remain in a greenhouse for 24 hours at 20° C. and at a relative atmospheric humidity of 70 percent. The plants are then inoculated with an aqueous conidium suspension of the apple scab causative organism (*Fusicladium dendriticum Fuckel*) and incubated for 18 hours in a humidity chamber at 18°–20° C. and at a relative atmospheric humidity of 100 percent.

The plants are then again placed in a greenhouse for 14 days.

Fifteen days after inoculation, the infestation of the seedlings is determined as a percentage of the untreated but also inoculated control plants.

Zero percent means no infestation; whereas 100 percent means that the infestation is exactly as great as in the case of the control plants.

The particular active compounds tested, their concentrations and the results obtained can be seen from the following table 5.

TABLE 5

Fusicladium test (Protective)

| Active compound No. (See Ex. 6 to 8) | Infestation as a percentage of the infestation of the untreated control with a concentration of active compound (in %) of 0.025 | 0.0062 |
|---|---|---|
| $(22_2)$ | 0 | 26 |
| $(19_3)$ | 0 | 38 |

The following further examples are set forth to illustrate, without limitation, the process for producing the particular active compounds according to the present invention.

EXAMPLE 6

[reaction variant (a)]

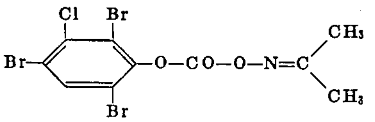

$(2_4)$ 27.1 g. acetoxime-0-carbonic acid ester chloride dissolved in 27 g. methylene chloride are added dropwise at 23° C. to a mixture of 72 g. (0.197 mol) 3-chloro-2,4,6-tribromo-phenol, 17.4 g. pyridine (0.22 mol.) and 80 ml. acetonitrile. The reaction mixture is kept at 40° C. for 7 hours. 300 ml. methylene chloride are added thereto, and stirring is effected at 0° C. with sodium carbonate solution. The methylene chloride solution is then washed twice with water, dried over potassium carbonate and evaporated. After drying of the residue at 50° C./0.05 mm. Hg, the yield of carbonic acid 3-chloro-2,4,6-tribromo-phenyl-0acetoxime ester is 78 g. (85 percent of the theory); m.p. 103.5°–106° C. Recrystallized from butyl acetate/petroleum ether, the compound melts at 113.5° C.

EXAMPLE 7

[reaction variant (a)]

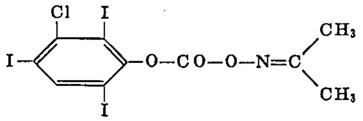

$(1_5)$ 8.5 g. (0.061 mol) powdered potassium carbonate are added, with effective stirring, to 25.3 g. (0.05 mol) 3-chloro-2,4,6-triiodo-phenol in 50 ml. of dry acetone, and 0.06 mol acetoxime-0-carbonic acid ester chloride as a 34 percent solution in methylene chloride are added dropwise at 24° C. Stirring is continued for 2 hours at 25° C. 600 ml. methylene chloride and 200 g. ice are then stirred in. The methylene chloride solution is washed twice with ice-cold water, dried over potassium carbonate and largely evaporated. By addition of 300 ml. petroleum ether and cooling to 0° C., the separation of crystals is increased. After drying at 50° C./0.1 mm. Hg, the yield of carbonic acid 3-chloro-2,4,6-triiodo-phenyl-0-acetoxime ester is 23.5 g. (77.5 percent of the theory); m.p. 196° C. (decomposition).

EXAMPLE 8

In manner analogous to that described in examples 6 and 7, the oxime-0-carbonic acid phenyl esters given in the following list are also prepared.

| | Active compound | Physical constant |
|---|---|---|
| $(22_3)$ ...... | 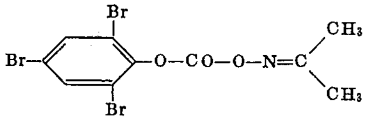 | Decomposition >95° C. |
| $(19_4)$ ...... | 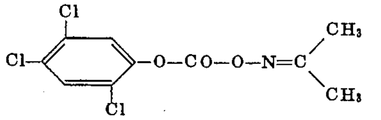 | M.P. 108–115.5° C. (decomposition) from acetone. |
| $(23_1)$ ...... | 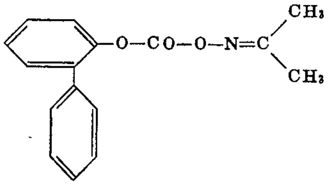 | M.P. 43.5° C. from dibutyl ether, B.P. 139° C./0.04. |
| $(21_2)$ ...... | 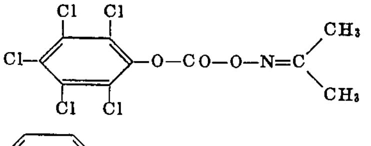 | M.P. 156–160° C. from acetone. |
| $(20_3)$ ...... | 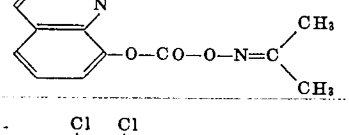 | M.P. 130.5° C. from acetone. |
| $(24_1)$ ...... | 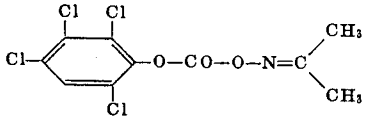 | M.P. 85° C. from petroleum ether. |

| | Active compound | Physical constant |
|---|---|---|
| $(25_1)$ | 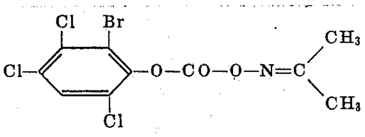 | M.P. 102° C. from petroleum ether. |
| $(3_2)$ | 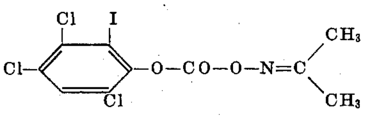 | M.P. 141° C. from petroleum ether/ methylene chloride. |
| $(4_2)$ | 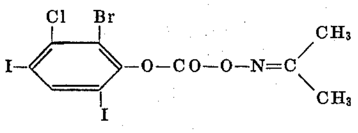 | M.P. 169–172° C (decomposition) from acetone. |
| $(5_2)$ | 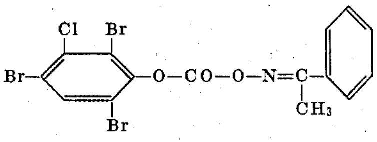 | M.P. 166° C. from acetonitrile. |
| $(6_2)$ | 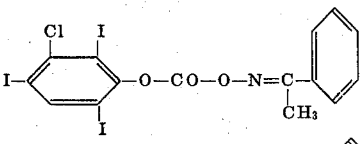 | M.P. 156.5° C. from acetonitrile. |
| $(7_2)$ | 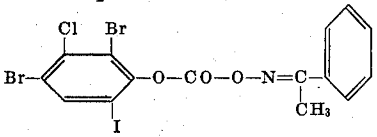 | M.P. 163.5° C. from acetonitrile. |
| $(26_1)$ | 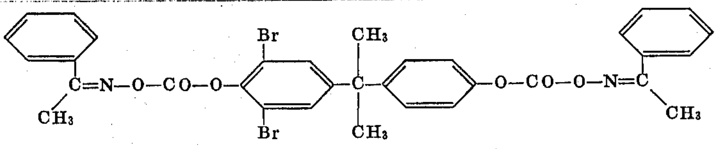 | M.P. 262° C. from acetonitrile. |
| $(8_2)$ | 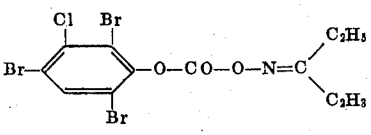 | M.P. 93° C. from petroleum ether. |
| $(9_2)$ | 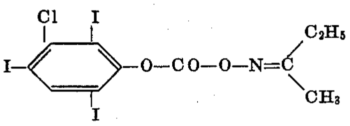 | M.P. 169° C. from acetonitrile. |
| $(10_2)$ | 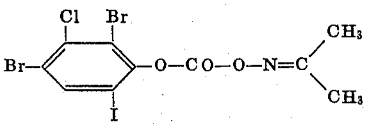 | M.P. 142° C. |
| $(11_2)$ | 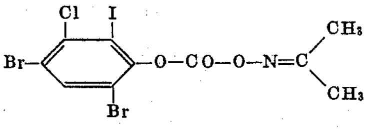 | M.P. 134–137° C. |
| $(12_2)$ | 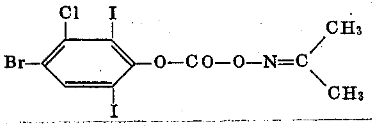 | Decomposition 173–179° C. |
| $(27_1)$ | 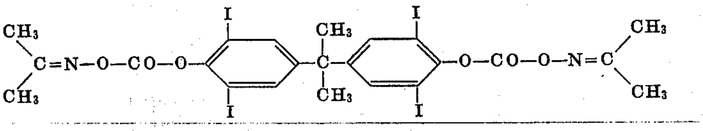 | M.P. 191° C. from acetone/petroleum ether (2:3). |

| | Active compound | Physical constant |
|---|---|---|
| $(13_2)$ | 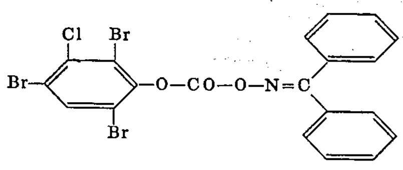 | M.P. 166.5° C. from ethylene chloride/light petroleum. |
| $(28_1)$ | 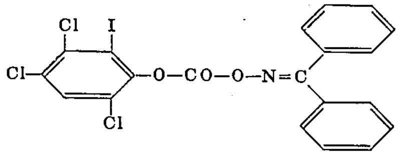 | M.P. 144.5° C. from methylene chloride. |
| $(29_1)$ | 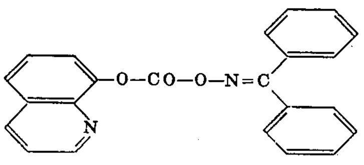 | M.P. 144° C. from ethyl acetate. |
| $(16_2)$ | 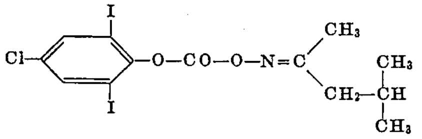 | M.P. 64° C. from light petroleum. |
| $(15_2)$ | 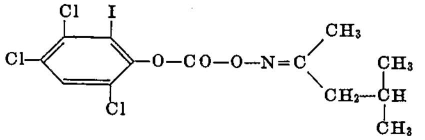 | M.P. 104° C. from acetone. |
| $(14_2)$ | 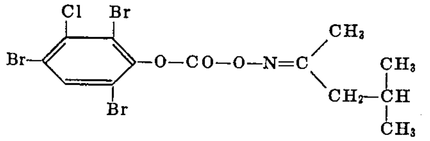 | M.P. 110° C. from acetone. |
| $(17_2)$ | 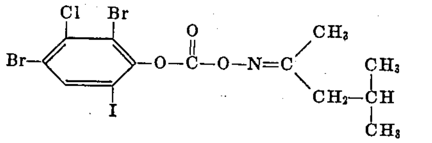 | M.P. 121° C. from acetone. |
| $(18_2)$ | 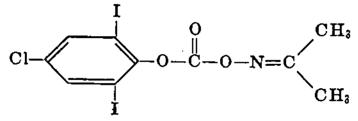 | M.P. 157.5° C. from methylene chloride/light petroleum. |

The following compounds are particularly preferred:

(14) carbonic acid (3-chloro-2,4,6-tribromo-phenyl)-methyl-isobutyl-ketonoxime-0-ester

(12) carbonic acid (2,6-diiodo-4-bromo-5-chloro-phenyl)-0-acetoxime ester

(10) carbonic acid (2-iodo-4,6-dibromo-5-chloro-phenyl)-0acetoxime ester

(16) carbonic acid (2,6-diiodo-4-chloro-phenyl)-methyl-isobutyl-ketonoxime-0-ester It will be realized by the artisan that all of the foregoing compounds contemplated by the present invention possess the desired strong fungicidal properties, with regard to a broad spectrum of activity, as well as a comparatively low toxicity toward warmblooded creatures and a concomitantly low phytotoxicity, enabling such compounds to be used with correspondingly favorable compatibility with respect to warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention.

What is claimed is:

1. Oxime-0-carbonic acid ester of the formula $$X{-}O{-}CO{-}O{-}N{=}C\begin{matrix}R^1\\ R^2\end{matrix}$$

in which $R^1$ is selected from the group consisting of alkyl of one to four carbon atoms and phenyl, $R^2$ is selected from the group consisting of alkyl of one to four carbon atoms, phenyl and hydrogen, and X is selected from the group consisting of (i) 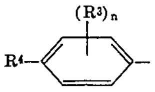

in which $R^3$ and $R^4$ each individually is selected from the group consisting of chloro, bromo and iodo, and *n* is a whole number from one to four, (ii) 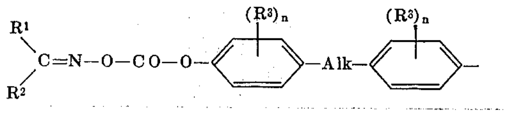

in which $R^1$, $R^2$, $R^3$ and $n$ are the same as defined above, and Alk is alkylene of one to four carbon atoms, (iii) diphenyl, and (iv) quinolyl.

2. Compound according to claim 1 wherein $R^1$ and $R^2$ each individually is selected from the group consisting of $C_{1-4}$ alkyl and phenyl, and X is selected from the group consisting of (i) 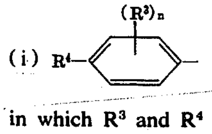

in which $R^3$ and $R^4$ each individually is selected from the group consisting of chloro, bromo and iodo, and $n$ is two to four, (ii) 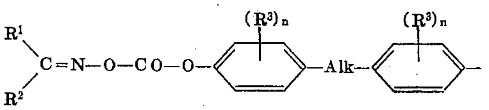

in which $R^1$, $R^2$, $R^3$ and $n$ are the same as defined above, and Alk is $C_{2-4}$ alkylene, (iii) orthro-diphenyl, and (iv) quinolyl.

3. Compound according to claim 1 wherein Rand $R^2$ each individually is selected from the group consisting of $C_{1-4}$ alkyl and phenyl, and X is

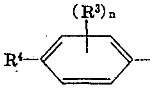

in which $R^3$ and $R^4$ each individually is selected from the group consisting of chloro, bromo and iodo, and $n$ is two to four.

4. Compound according to claim 1 wherein $R^1$ and $R^2$ individually is selected from the group consisting of $C_{1-4}$ alkyl and phenyl, and X is

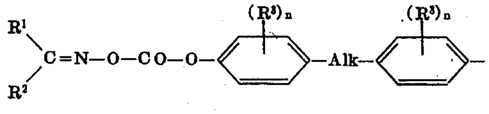

in which $R^1$ and $R^2$ are the same as defined above, $R^3$ is selected from the group consisting of chloro, bromo and iodo, and $n$ is two to four.

5. Compound according to claim 1 wherein $R^1$ and $R^2$ each individually is selected from the group consisting of $C_{1-4}$ alkyl and phenyl, and X is ortho-diphenyl.

6. Compound according to claim 1 wherein $R^1$ and $R^2$ each individually is selected from the group consisting of $C_{1-4}$ alkyl and phenyl, and X is quinol-8-yl.

7. Compound according to claim 1 wherein such compound is carbonic acid 3-chloro-2,4,6-tribromo-phenyl-methyl-isobutyl-keton-oxime-0-ester of the formula

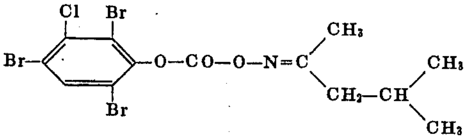

8. Compound according to claim 1 wherein such compound is carbonic acid(2,6-diiodo-4-bromo-5-chloro-phenyl)-0acetoxime-ester of the formula

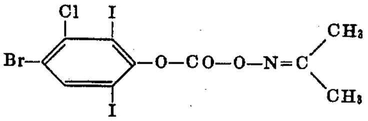

9. Compound according to claim 1 wherein such compound is carbonic acid(2-iodo-4,6-dibromo-5-chloro)-phenyl-0-acetoxime-ester of the formula

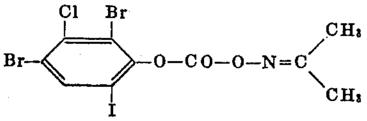

10. Compound according to claim 1 wherein such compound is carbonic acid(2,6-diiodo-4-chloro-phenyl)-methyl-isobutyl-ketonooxime 0-ester of the formula

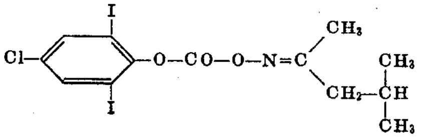

FO-1050
(5/69)

UNITED STATES PATENT OFFICE
CERTIFICATE OF CORRECTION

Patent No. 3,624,091 Dated November 30, 1971

Inventor(s) Werner Daum et al

It is certified that error appears in the above-identified patent and that said Letters Patent are hereby corrected as shown below:

Col. 2, line 50 (Spec. p.5, line 3)

"represents" should be --represent--

Col. 8, Example 1, line 3 (Spec. p. 19, line 10)

"0.50" should be ---0.05--

Col. 9, line 50 (Spec. p. 25, line 5)

Before "inhibition" --medium-- should be inserted

Col. 12, line 2 (Spec. P. 12, line 23)

Between "O" and "acetoxime" a hyphen should be inserted

Col. 13/14, 7th formula (Spec. p. 36, 1st formula)

" 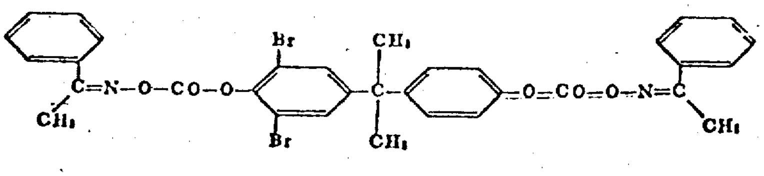 "

should be

-- ($26_1$) 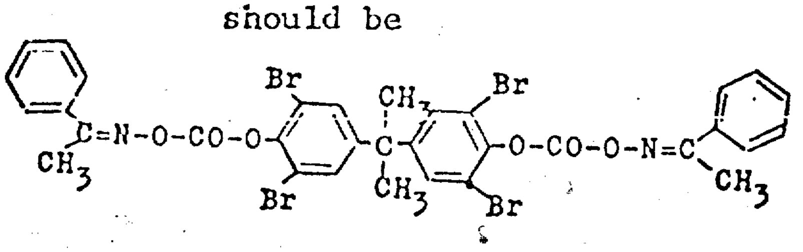 --

PO-1050
(5/69)

UNITED STATES PATENT OFFICE

CERTIFICATE OF CORRECTION

Patent No. 3,624,091 Dated November 30, 1971

Inventor(s) Werner Daum et al PAGE - 2

It is certified that error appears in the above-identified patent and that said Letters Patent are hereby corrected as shown below:

Col. 15, line 60 (Spec. p. 37, line 7)

"Oacetoxime" should be --O-acetoxime--

Claim 4, line 1 (Spec., line 1)

After "$R^2$" --each--should be inserted

Claim 8, line 3 (Spec. lines 2/3)

"Oacetoxime" should be --O-acetoxime--

Claim 10, line 3 (Spec. line 3)

"ketonooxime" should be --keton-oxime--

Signed and sealed this 23rd day of May 1972.

(SEAL)
Attest:

EDWARD M.FLETCHER,JR.
Attesting Officer

ROBERT GOTTSCHALK
Commissioner of Patents